United States Patent
Shim

(10) Patent No.: US 7,613,155 B2
(45) Date of Patent: Nov. 3, 2009

(54) TERMINAL, SYSTEM AND METHOD FOR PROVIDING LOCATION INFORMATION SERVICE BY INTERWORKING BETWEEN WLAN AND MOBILE COMMUNICATION NETWORK

(75) Inventor: Dong-Hee Shim, Seoul (KR)

(73) Assignee: LG Electronics Inc., Seoul (KR)

( * ) Notice: Subject to any disclaimer, the term of this patent is extended or adjusted under 35 U.S.C. 154(b) by 543 days.

(21) Appl. No.: 11/410,914

(22) Filed: Apr. 26, 2006

(65) Prior Publication Data

US 2006/0245406 A1 Nov. 2, 2006

Related U.S. Application Data

(60) Provisional application No. 60/690,100, filed on Jun. 13, 2005, provisional application No. 60/690,104, filed on Jun. 13, 2005, provisional application No. 60/690,107, filed on Jun. 13, 2005, provisional application No. 60/734,279, filed on Nov. 8, 2005.

(30) Foreign Application Priority Data

| Apr. 30, 2005 | (KR) | .................. 10-2005-0036513 |
| Jun. 22, 2005 | (KR) | .................. 10-2005-0054174 |
| Feb. 9, 2006 | (KR) | .................. 10-2006-0012760 |
| Mar. 31, 2006 | (KR) | .................. 10-2006-0029927 |

(51) Int. Cl.
*H04W 4/00* (2006.01)

(52) U.S. Cl. .................. 370/338; 455/404.2; 455/456.1

(58) Field of Classification Search .................. 370/338
See application file for complete search history.

(56) References Cited

U.S. PATENT DOCUMENTS

| 2004/0203914 | A1 | 10/2004 | Kall et al. |
| 2005/0239480 | A1* | 10/2005 | Kim et al. ............... 455/456.1 |
| 2006/0154645 | A1* | 7/2006 | Valkenburg ............... 455/411 |
| 2006/0258371 | A1* | 11/2006 | Krishnamurthi et al. . 455/456.1 |
| 2006/0274696 | A1* | 12/2006 | Krishnamurthi ............ 370/331 |
| 2007/0121560 | A1* | 5/2007 | Edge ........................ 370/338 |

FOREIGN PATENT DOCUMENTS

WO WO-2005/006802 A1 1/2005

OTHER PUBLICATIONS

Zundt et al., Proceedings of the 2nd workshop on Positioning, Navigation and Communication (WPNC'05) & 1st Ultra—Wideband Expert Talk (UET'05), "Realizing Peer-to-Peer Location—Based Services in Mobile Networks", Mar. 2005, pp. 175-181.

* cited by examiner

*Primary Examiner*—Rafael Gutiérrez
*Assistant Examiner*—German Viana Di Prisco
(74) *Attorney, Agent, or Firm*—Birch, Stewart, Kolasch & Birch, LLP

(57) ABSTRACT

A WLAN terminal, system and method for providing a SUPL service, are discussed. According to an embodiment, the WLAN terminal includes a controller to establish an IP connection with a mobile communication network through interworking between the mobile communication network and a WLAN, and selectively perform a SUPL procedure with a location server of the mobile communication network through the IP connection in response to a request for location information of the WLAN terminal from the location server.

8 Claims, 7 Drawing Sheets

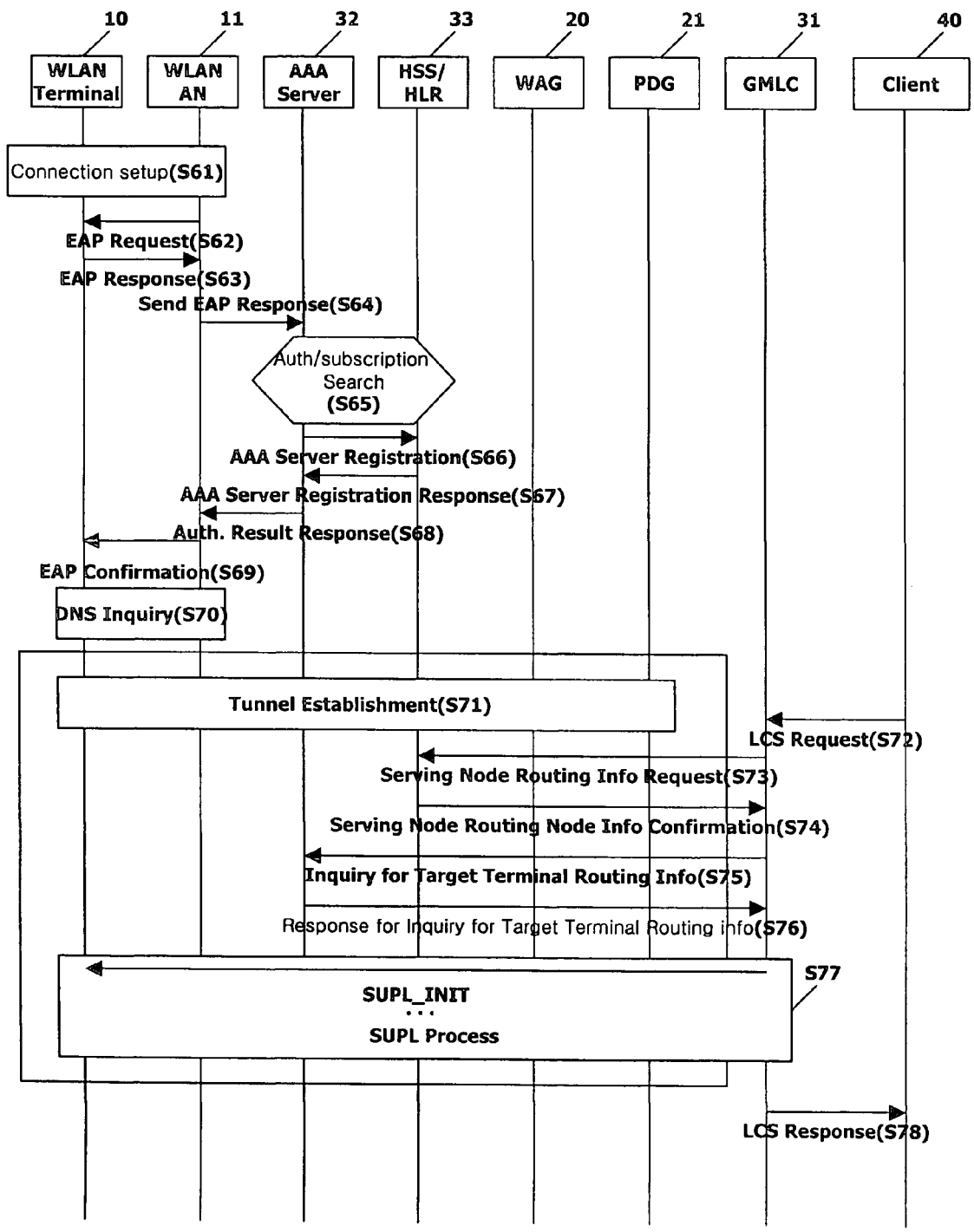

Fig.6

| Label | Description | Example |
|---|---|---|
| country | The country is identified by the two-letter ISO 3166 code. | US |
| A1 | national subdivisions (state, region, province, prefecture) | New York |
| A2 | county, parish, gun (JP), district (IN) | King's County |
| A3 | city, township, shi (JP) | New York |
| A4 | city division, borough, city district, ward, chou (JP) | Manhattan |
| A5 | neighborhood, block | Morningside Heights |
| A6 | street | Broadway |
| PRD | Leading street direction | N, W |
| POD | Trailing street suffix | SW |
| STS | Street suffix | Avenue, Platz, Street |
| HNO | House number, numeric part only. | 123 |
| HNS | House number suffix | A, 1/2 |
| LMK | Landmark or vanity address | Low Library |
| LOC | Additional location information | Room 543 |
| FLR | Floor | 5 |
| NAM | Name (residence, business or office occupant) | Joe's Barbershop |
| PC | Postal code | 10027-0401 |

TERMINAL, SYSTEM AND METHOD FOR PROVIDING LOCATION INFORMATION SERVICE BY INTERWORKING BETWEEN WLAN AND MOBILE COMMUNICATION NETWORK

This application claims the priority benefits of U.S. Provisional Application No. 60/690,100 filed on Jun. 13, 2005; U.S. Provisional Application No. 60/690,104 filed on Jun. 13, 2005; U.S. Provisional Application No. 60/690,107 filed on Jun. 13, 2005; U.S. Provisional Application No. 60/734,279 filed on Nov. 8, 2005; Korean Patent Application No. 10-2005-036513 filed on Apr. 30, 2005 in Republic of Korea; Korean Patent Application No. 10-2005-054174 filed on Jun. 22, 2005 in Republic of Korea; Korean Patent Application No. 10-2006-0012760 filed on Feb. 9, 2006 in Republic of Korea; and Korean Patent Application No. 10-2006-0029927 filed on Mar. 31, 2006 in Republic of Korea. The entire contents of each of these applications are hereby fully incorporated by reference.

BACKGROUND OF THE INVENTION

1. Field of the Invention

The present invention relates to a location information system and, more particularly, to a user equipment (UE), system and method for providing a location information service through interworking between a mobile communication system and a wireless local area network (WLAN).

2. Description of the Related Art

In general, a mobile communication system has a function part for calculating a location of a terminal in a mobile communication network to provide a location service and for transferring the calculated location of the terminal to a certain entity periodically or according to a corresponding request.

A network structure related to the location service differs depending on an internal network structure such as a 3GPP network, a 3GPP2 network, etc. Currently, there are several methods for calculating the position (location) of the mobile terminal, including a cell-ID method for transferring an ID of a cell to which a mobile terminal belongs, a method for calculating a location of a mobile terminal through triangulation by measuring the time required for radio waves to reach each base station from the mobile terminal, and a method of using a GPS (Global Positioning System).

In order to provide the location service to a user, a large amount of signaling and position information is transferred between a mobile terminal and a location server. Recently, positioning technologies for providing a location service, namely, the location service provided based on the location of a mobile terminal, are increasingly used. These technologies can be provided generally through a user plane and a control plane, one of which is a SUPL (Secure User Plane Location) technique that provides the location service through the user plane.

Effective for transferring information required for calculating the location of the mobile terminal, the SUPL (Secure User Plane Location) technique uses a user plane data bearer to carry a positioning technology-related protocol between the mobile terminal and a SUPL network.

Generally, in the location information system, the SUPL network related to the location service includes a SUPL agent, an SLP (SUPL location platform) and a SET (SUPL Enabled Terminal), etc. The SUPL agent is a service logical access point (AP) using actually measured location information, and the SLP is a SUPL service AP of a network part that accesses network resources to obtain the location information. The SET is a device for communicating with the SUPL network using a SUPL interface, and can be, for example, one of a UE (User Equipment) of a UMTS, an MS (Mobile Station) of a GSM, an MS of an IS-95, and a laptop computer or a PDA (Personal Digital Assistant) having the SET function.

A network to which the user originally registered is called a home network, and a network of an area to which the user is located after having moved from the home network is called a visited network. An SLP within the home network is called a home SLP (H-SLP), and an SLP within the visited network is called a visited network (V-SLP). When the network starts the SUPL procedure, an SLP first connected by an external client is called a requesting SLP (R-SLP), which is a logical entity that may or may not be the same as the H-SLP. A SET aimed for tracking its current location is called a target SET.

The SLP, a network element, includes an SPC (SUPL Positioning Center) that calculates the actual location information (location/position) of the target SET, and an SLC (SUPL Location Center) that handles additional functions other than calculating the location information. For example, the SLC performs and/or supports the procedures for roaming, resource management, and the like. The SET can calculate the location information through communication with the SPC via the SLC (in case of a proxy mode) or can calculate the location information by directly opening a connection with the SPC (in case of a non-proxy mode).

FIG. 1 is a signal flow chart illustrating a SUPL procedure of a SUPL-based location information system when a network requests location information regarding a particular terminal in a proxy mode and when roaming is not performed.

As shown in FIG. 1, the SUPL-based location information system includes a SUPL agent 1, an SLP 3 and a target SET 5. The SLP 3 is a location server and the target SET 5 is a target terminal.

When the SUPL agent 1 transmits an MLP (Mobile Location Protocol) SLIR (Standard Location Immediate Request) message to the SLP 3 to request location information regarding the target SET 5 (step S11), the SLP 3 checks whether or not the target SET 5 has been roaming, namely, whether or not the target SET 5 currently belongs to a different visited network, and also checks whether or not the target SET 5 supports the SUPL (step S12).

The SLP 3 transmits a SUPL initialization message (SUPL INIT) to the target SET 5 to start the SUPL procedure with the target SET 5 (step S13). In this case, the SUPL initialization message includes at least a session ID, an address of the SLP, and a position method to be used, etc. In addition, privacy, which can be used in a case where a notification related to the location information of the target SET is required to be provided to the user after confirming privacy of the target SET 5 by the SLP 3, can be also included in the SUPL initialization message. Also, an SLP mode indicator (SLP mode), which indicates a mode (e.g., proxy mode, non-proxy mode, etc.) of the SLP 3, can be included in the SUPL initialization message, which is an inventive concept owned by the assignee of the present application and included in a co-pending U.S. patent application.

If the target SET 5, which has received the SUPL initialization message, is not opened for a data connection with any network, it requests a data connection from a packet data network such as a 3GPP or a 3GPP2, etc.

When the data connection is made (step S14), the target SET 5 transmits a SUPL location initialization message (SUPL POS INIT) to the SLP 3 to start a procedure for determining the position/location information of the target SET 5 (step S15). And then, the target SET 5 and the SLP 3 exchange successive messages for performing the actual positioning determining process, and the SLP 3 or the target SET 5 calculates the current location of the target SET 5 through the successive messages (step S16). In this case, the SUPL location initialization (SUPL POS INIT) message includes at least a session ID, an LID (location Identifier) indicating a base station ID, and capabilities of the target SET. The messages exchanged between the target SET 5 and the SLP 3 may include a session ID, a protocol (e.g., an RRLP, an RRC or a TIA-801) to be used for positioning, etc.

After the location of the target SET 5 is calculated, the SLP 3 transmits a SUPL end message (SUPL END) for informing about the termination of the SUPL procedure to the target SET 5 (step S17) and also transmits the calculated location information (posresult) of the target SET 5 to the SUPL agent 1 through an MLP SLIA (Standard Location Immediate Answer) message (step S18).

Recently, as Internet services using the WLAN become more common, interest in a technology that allows a user of a WLAN terminal to be connected with the WLAN through a mobile communication network to receive an Internet service in an area where the WLAN is not supported, exists. A network for applying this technology can be dubbed an I-WLAN (Interworking-WLAN) in the 3GPP, and it would be desirable for the 3GPP network (or other mobile communication network) to provide various supplementary services including the location information service by interoperability (interworking) with the WLAN.

However, because there is neither the network structure nor protocol for providing a location information service (e.g., SUPL service) in the related art system involving the conventional WLAN and 3GPP network, the WLAN terminal cannot receive the location information service through the 3GPP network according to the related art.

SUMMARY OF THE INVENTION

Therefore, an object of the present invention is to provide a terminal or user equipment (UE), system and method of providing a location information service, which address the limitations and disadvantages associated with the related art.

Another object of the present invention is to provide a WLAN terminal (UE), system and method for providing a location information service, which are capable of defining a network structure and a protocol to provide the location information service to the WLAN terminal through interworking between a WLAN and a mobile communication network/system.

Another object of the present invention is to provide a WLAN terminal (UE), system and method for providing a location information service through interworking between a WLAN and a mobile communication network, wherein when a location server connected with the mobile communication network receives a request for location information of the WLAN terminal from a client connected with the mobile communication network, it provides the requested location information of the WLAN terminal to the client through communication between a certain entity of the location server and the mobile communication network and an entity for interworking between the WLAN and the mobile communication network.

Still another object of the present invention is to provide a WLAN terminal (UE), system and method for providing a location information service through interworking between a WLAN and a mobile communication network, wherein when the WLAN terminal undergoes an authentication and registration process through the mobile communication network, terminal location related information is stored, and when tracking of the location information of the WLAN terminal is requested by a client, if the terminal location related information obtained by a location server from an AAA (Authentication/Authorization/Accounting) server or an HSS (Home Subscriber Server)/HLR (Home Location Register) satisfies a QoP (Quality of Position) of the request for tracking the location received from the client, the location server can provide the obtained terminal location related information to the client as the location information of the WLAN terminal.

Yet another object of the present invention is to provide a WLAN terminal (UE), system and method, wherein when a client requests location information of a particular WLAN terminal which has been registered to a network to receive a service, it is checked whether the WLAN terminal has been authenticated by and connected with the network, and if the WLAN terminal has been authenticated and connected with the network, location information of the WLAN terminal is detected by using a SUPL procedure and then provided to the client.

To achieve at least the above and other objects in whole or in parts, there is provided according to an aspect of the present invention a method for providing a terminal location information service between a location server and a client, comprising: receiving by the location server a request for tracking a location of a particular terminal from the client; confirming by the location server routing information of the particular terminal; and if there is a connection between the terminal and a packet data gateway (PDG), transmitting a SUPL INIT message through the connection.

To achieve at least these advantages in whole or in parts, there is further provided according to another aspect of the present invention a method for providing a location information service through interworking between a WLAN and a mobile communication network, comprising: receiving by a location server a request for tracking a location of a WLAN terminal from a client; obtaining by the location server routing information of a serving node to which the WLAN terminal belongs from an HSS/HLR; obtaining, by the location server, routing information of the WLAN terminal from the serving node; determining by the location server a SUPL initialization message transmission method according to the WLAN terminal routing information and transmitting it; calculating location information of the WLAN terminal through a SUPL procedure between the WLAN terminal which has received a SUPL initialization message and the location server; and providing by the location server the calculated location information of the WLAN terminal to the client.

To achieve at least these advantages in whole or in parts, there is further provided according to another aspect of the present invention a method for providing a location information service through interworking between a WLAN and a mobile communication network, comprising: receiving by a location server a request for tracking a location of a WLAN terminal from a client; requesting, by the location server, routing information of a serving node to which the WLAN terminal belongs from an HSS/HLR; providing, by the HSS/HLR, routing information of the serving node to the location server; requesting, by the location server, routing information of the WLAN terminal from the serving node; providing, by the serving node, routing information of the WLAN terminal to the location server; and confirming information on a tunnel between the WLAN terminal and a packet data gateway (PDG) included in the routing information of the WLAN terminal, and transmitting by the location server a SUPL initialization message to the WLAN terminal through the tunnel.

To achieve at least these advantages in whole or in parts, there is further provided according to another aspect of the present invention a method for providing a location information service through interworking between a WLAN and a mobile communication network, comprising: receiving by a location server a request for tracking a location of a WLAN terminal from a client; requesting, by the location server, routing information of a serving node to which the WLAN terminal belongs from an HSS/HLR; providing, by the HSS/HLR, routing information of the serving node to the location server; requesting, by the location server, routing information of the WLAN terminal from the serving node; providing, by the serving node, routing information of the WLAN terminal to the location server; and transmitting by the location server a SUPL initialization message to the WLAN terminal if an IP address has not been currently set for the WLAN terminal.

To achieve at least these advantages in whole or in parts, there is further provided according to another aspect of the present invention a method for providing a location information service through interworking between a WLAN and a mobile communication network, comprising: receiving by a location server a request for tracking a location of a WLAN terminal from a client; obtaining, by the location server, routing information of a serving node to which the WLAN terminal belongs from an HSS/HLR; and if terminal location related information included in the obtained routing information of the serving node satisfies a QoP (Quality of Position), providing by the location server the terminal location related information to the client.

To achieve at least these advantages in whole or in parts, there is further provided according to another aspect of the present invention a method for providing a location information service through interworking between a WLAN and a mobile communication network, comprising: accessing an access network of a WLAN by a WLAN terminal; storing terminal location related information provided by the WLAN AN when authentication is performed through an AAA server and a registration is performed through an HSS/HLR; setting by the WLAN terminal a tunnel for a packet service with a packet data gateway (PDG); receiving by the location server a request for tracking a location of the WLAN terminal from a client; obtaining, by the location server, routing information of a serving node to which the WLAN terminal belongs from the HSS/HLR; and if the terminal location related information included in the obtained routing information of the serving node satisfies a QoP (Quality of Position) of the location tracking request received from the client, providing by the location server the terminal location related information to the client.

To achieve at least these advantages in whole or in parts, there is further provided according to another aspect of the present invention a method for providing a location information service through interworking between a WLAN and a mobile communication network, comprising: accessing an access network of a WLAN by a WLAN terminal; storing terminal location related information provided by the WLAN AN when authentication is performed through an AAA server and a registration is performed through an HSS/HLR; receiving by the location server a request for tracking a location of the WLAN terminal from a client; obtaining, by the location server, routing information of a serving node to which the WLAN terminal belongs from the HSS/HLR; if the terminal location related information included in the obtained routing information of the serving node satisfies a QoP (Quality of Position) of the location tracking request received from the client, providing by the location server the terminal location related information to the client; and transmitting by the location server a SUPL initialization message to the WLAN terminal through an SMS method or a WAP push method, or through a TCP/IP or UDP/IP connection, if the terminal location related information included in the WLAN terminal routing information does not satisfy the QoP or if the location server wants to perform a SUPL procedure with the WLAN terminal.

To achieve at least these advantages in whole or in parts, there is further provided according to another aspect of the present invention a method for providing a location information service in a system in which a particular WLAN terminal sets a tunnel with a packet data gateway (PDG) of a 3GPP network to receive a certain service, the method comprising: receiving by a location server a location information request message with respect to the WLAN terminal from a client; confirming, by the location server, privacy with respect to the WLAN terminal location information; transmitting by the location server a terminal information request message for requesting information regarding the WLAN terminal to an HSS (Home Subscriber Server)/HLR (Home Location Register); checking by the HSS/HLR whether there is information regarding the WLAN terminal; if there is no information regarding the WLAN terminal, transmitting by the HSS/HLR a user information request message to an AAA (Authentication/Authorization/Accounting) server that manages information regarding the WLAN terminal; receiving by the HSS/HLR a terminal information confirmation message including the WLAN terminal information from the AAA server and transmitting it to the location server; checking, by the location server which has received the terminal information confirmation message, a PDG connection state of the WLAN terminal through the WLAN terminal information, and if the WLAN terminal has been connected with the PDG, transmitting a location information request message to the PDG; tracking, by the location server which has received the location information confirmation message from the PDG, a location of the WLAN terminal; and transmitting, by the location server, location information of the WLAN terminal to the client.

To achieve at least these advantages in whole or in parts, there is further provided according to another aspect of the present invention a method for providing a location information service in a system in which a particular WLAN terminal sets a tunnel with a packet data gateway (PDG) of a 3GPP network to receive a certain service, the method comprising: receiving by a location server a location information request message with respect to the WLAN terminal from a client; confirming, by the location server, privacy with respect to the WLAN terminal location information; transmitting by the location server a terminal information request message for requesting information regarding the WLAN terminal to an HSS (Home Subscriber Server)/HLR (Home Location Register); checking by the HSS/HLR whether there is information of the WLAN terminal; if there is no information of the WLAN terminal, transmitting by the HSS/HLR a terminal information confirmation message including an address of an AAA (Authentication/Authorization/Accounting) server that manages information of the WLAN terminal, to the location server; transmitting by the location server a connection/non-connection check message for requesting information of the WLAN terminal to the AAA server; receiving by the location server a connection/non-connection check message including the WLAN terminal information from the AAA server; transmitting a location information request message to a PDG, if the location server confirms a PDG connected state of the WLAN terminal based upon the WLAN terminal information and connection with a corresponding PDG exists; tracking, by the location server which has received a location information confirmation message from the PDG, a location of the WLAN terminal; and transmitting, by the location server, location information of the WLAN terminal to the client.

According to another aspect, the present invention provides a wireless local area network (WLAN) terminal for providing a secure user plane location (SUPL) service, comprising: a controller to establish an IP connection with a mobile communication network through interworking between the mobile communication network and a WLAN, and selectively perform a SUPL procedure with a location server of the mobile communication network through the IP connection in response to a request for location information of the WLAN terminal from the location server.

According to another aspect, the present invention provides a wireless local area network (WLAN) terminal for providing a secure user plane location (SUPL) service, comprising: a controller to receive a SUPL initiation message from a location server of a mobile communication network and establish an IP connection with the mobile communication network through interworking between the mobile communication network and a WLAN, and to transmit a SUPL position initiation message to the location server through the IP connection.

According to another aspect, the present invention provides a mobile communication network for providing a secure user plane location (SUPL) service, comprising: a location server to establish an IP connection with a wireless local access network (WLAN) terminal through interworking between the mobile communication network and a WLAN, and to selectively perform a SUPL procedure with the WLAN terminal through the IP connection in response to a request of a client requesting location information of the WLAN terminal.

According to another aspect, the present invention provides a mobile communication network for providing a secure user plane location (SUPL) service, comprising: a location server to selectively transmit a SUPL initiation message to a wireless local area network (WLAN) terminal and establish an IP connection with the WLAN terminal through interworking between the mobile communication network and a WLAN, in response to a request of a client requesting location information of the WLAN terminal, and to receive a SUPL position initiation message from the WLAN terminal through the IP connection.

According to another aspect, the present invention provides a method for providing a secure user plane location (SUPL) service using a wireless local area network (WLAN) terminal, comprising: establishing, by the WLAN terminal, an IP connection with a mobile communication network through interworking between the mobile communication network and a WLAN; and selectively performing a SUPL procedure with a location server of the mobile communication network through the IP connection in response to a request for location information of the WLAN terminal from the location server.

According to another aspect, the present invention provides a method for providing a secure user plane location (SUPL) service using a wireless local area network (WLAN) terminal, comprising: receiving, by the WLAN terminal, a SUPL initiation message from a location server of a mobile communication network and establishing an IP connection with the mobile communication network through interworking between the mobile communication network and a WLAN; and transmitting, by the WLAN terminal, a SUPL position initiation message to the location server through the IP connection.

According to another aspect, the present invention provides a method for providing a secure user plane location (SUPL) service using a mobile communication network including a location server, comprising: establishing, by the location server, an IP connection with a wireless local access network (WLAN) terminal through interworking between the mobile communication network and a WLAN; and selectively performing, by the location server, a SUPL procedure with the WLAN terminal through the IP connection in response to a request of a client requesting location information of the WLAN terminal.

According to another aspect, the present invention provides a method for providing a secure user plane location (SUPL) service using a mobile communication network including a location server, comprising: selectively transmitting, by the location server, a SUPL initiation message to a wireless local area network (WLAN) terminal and establishing an IP connection with the WLAN terminal through interworking between the mobile communication network and a WLAN, in response to a request of a client requesting location information of the WLAN terminal; and receiving, by the location server, a SUPL position initiation message from the WLAN terminal through the IP connection.

According to another aspect, the present invention provides a method of providing a secure user plane location (SUPL) service by interworking between a mobile communication network and a wireless local area network (WLAN), wherein the mobile communication network includes an access point, a storage unit and a location server and wherein an IP connection is established between a WLAN terminal and the location server through the access point, the method comprising: requesting, by the location server, serving node routing information and capability information of the WLAN terminal from the storage unit in response to a client's location information request; receiving, by the location server, the requested serving node routing information and capability information from the database; requesting, by the location server to the authentication server, target terminal routing information using in part the received serving node routing information; receiving, by the location server, the target terminal routing information from the authentication server; and performing, by the location server, a SUPL procedure with the WLAN terminal using in part the received target terminal routing information through the established IP connection, so as to obtain location information of the WLAN terminal.

According to another aspect, the present invention provides a method of providing a secure user plane location (SUPL) service by interworking between a mobile communication network and a wireless local area network (WLAN), wherein the mobile communication network includes an access point, a storage unit and a location server and wherein an IP connection is established between a WLAN terminal and the location server through the access point, the method comprising: requesting, by the location server, serving node routing information and capability information of the WLAN terminal from the storage unit in response to the client's location information request; and receiving, by the location server, the requested information from the database, wherein the serving node routing information received by the location server includes address information of the authentication server and terminal location related information registered in the storage unit; determining, by the location server, whether the received terminal location related information satisfies a QoP (quality of position) request included in the client's location information request; selectively providing, from the location server to the client, the terminal location related information as location information of the WLAN terminal based on the determination result; requesting, by the location server to the authentication server, target terminal routing information using in part the received serving node routing information, if the terminal location related information does not satisfy the QoP request; receiving, by the location server, the target terminal routing information from the authentication server; and performing, by the location server, a SUPL procedure with the WLAN terminal using in part the received target terminal routing information through the established IP connection.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

BRIEF DESCRIPTION OF THE DRAWINGS

The invention will be described in detail with reference to the following drawings in which like reference numerals refer to like elements wherein:

FIG. 5 is a flow chart illustrating a method for providing a location information service through interworking between the WLAN and the mobile communication network in accordance with a third embodiment of the present invention;

FIG. 6 is a view showing an example of a format of location information of a WLAN terminal or a WLAN AP in accordance with an embodiment of the present invention.

DETAILED DESCRIPTION OF THE PREFERRED EMBODIMENTS

The present invention provides a network structure and protocol for allowing a WLAN terminal (UE) to receive a location information service through a mobile communication network, and provides a relevant call flow. Specifically, the present invention provides a method and system in which when a location server of a mobile communication network receives a request for a location of the WLAN terminal from a client, the location server communicates with a certain entity of the mobile communication network and an entity for allowing interworking between a WLAN and the mobile communication network, and provides location information of the WLAN terminal to the client.

The present invention applies a SUPL, namely, a protocol for providing a user location information service through a TCP/IP or UDP/IP connection between the location server and a mobile terminal (or UE), for a service through interworking between the WLAN and the mobile communication system/network, whereby a user of the WLAN terminal can receive the location information service through the mobile communication network.

Figure 2:
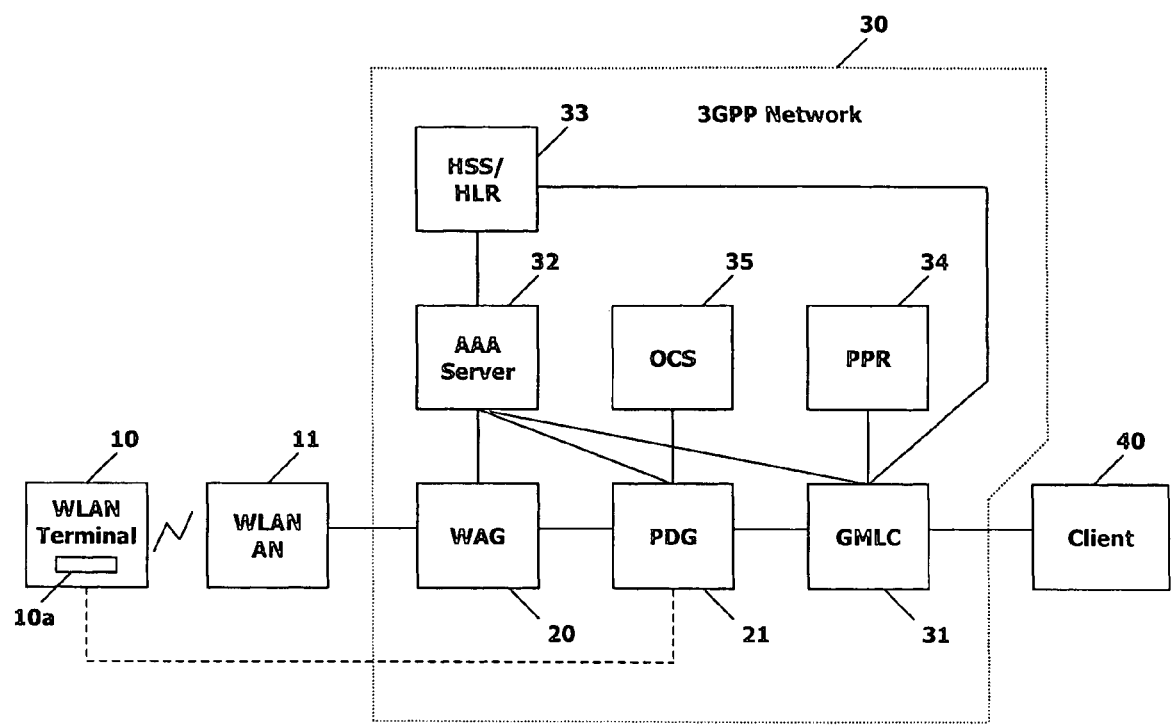
FIG. 2 is a schematic construction of a system for providing a location information service through interworking between a WLAN and a mobile communication network in accordance with the present invention.

FIG. 2 is a schematic construction of a system for providing a location information service through interworking between a WLAN and a mobile communication network in accordance with an embodiment of the present invention.

As shown in FIG. 2, the system for providing a location information service in accordance with the present invention includes a WLAN terminal 10, a mobile communication network 30 such as a 3GPP network (public land mobile network (PLMN)), a WLAN access network (WLAN AN) 11 for connecting the WLAN terminal 10 to a WLAN for interworking with the mobile communication network 30, and a client 40 connected to the mobile communication network 30 and requesting location information of the WLAN terminal 10 and/or using the obtained location information. The WLAN terminal 10 includes a controller/processor 10a and other components known in the related art WLAN terminals or the like. All the components of the system of FIG. 2 are operatively coupled and configured.

The mobile communication network 30 includes a location server for calculating requested location information through a SUPL procedure with a corresponding terminal through interworking with the WLAN and for providing the calculated location information to the client 40. In the example, the mobile communication network 30 is a 3GPP network, but can be others such as a 3GPP2 network or the like. The mobile communication network 30 such as the 3GPP or 3GPP2 network includes a gateway mobile location center (GMLC) 31 functioning as the location server; an AAA (Authentication/Authorization/Accounting) server 32 existing in a mobile communication home network and performing functions such as authentication, authorization and accounting; an HSS/HLR (Home subscriber Sever/Home Location Register) 33 for managing user information and an AAA server address of each user; a PPR (Privacy Profile Register) 34 connected with the location server (GLMC) 31 and storing privacy information of a user related to the location information; an OCS (Online Charging System) 35 for collecting in real time a usage fee with respect to a WLAN service used by the WLAN terminal 10 according to time and a usage amount; a WLAN access gateway (WAG) 20 for connecting the WLAN AN 11 and the AAA server 32; and an access point AP (packet data gateway (PDG)) 21 for connecting a packet switch network to provide a packet switched service of mobile communication to the WLAN terminal 10. The HSS/HLR 33 can also be considered a storage or database.

Figure 3:
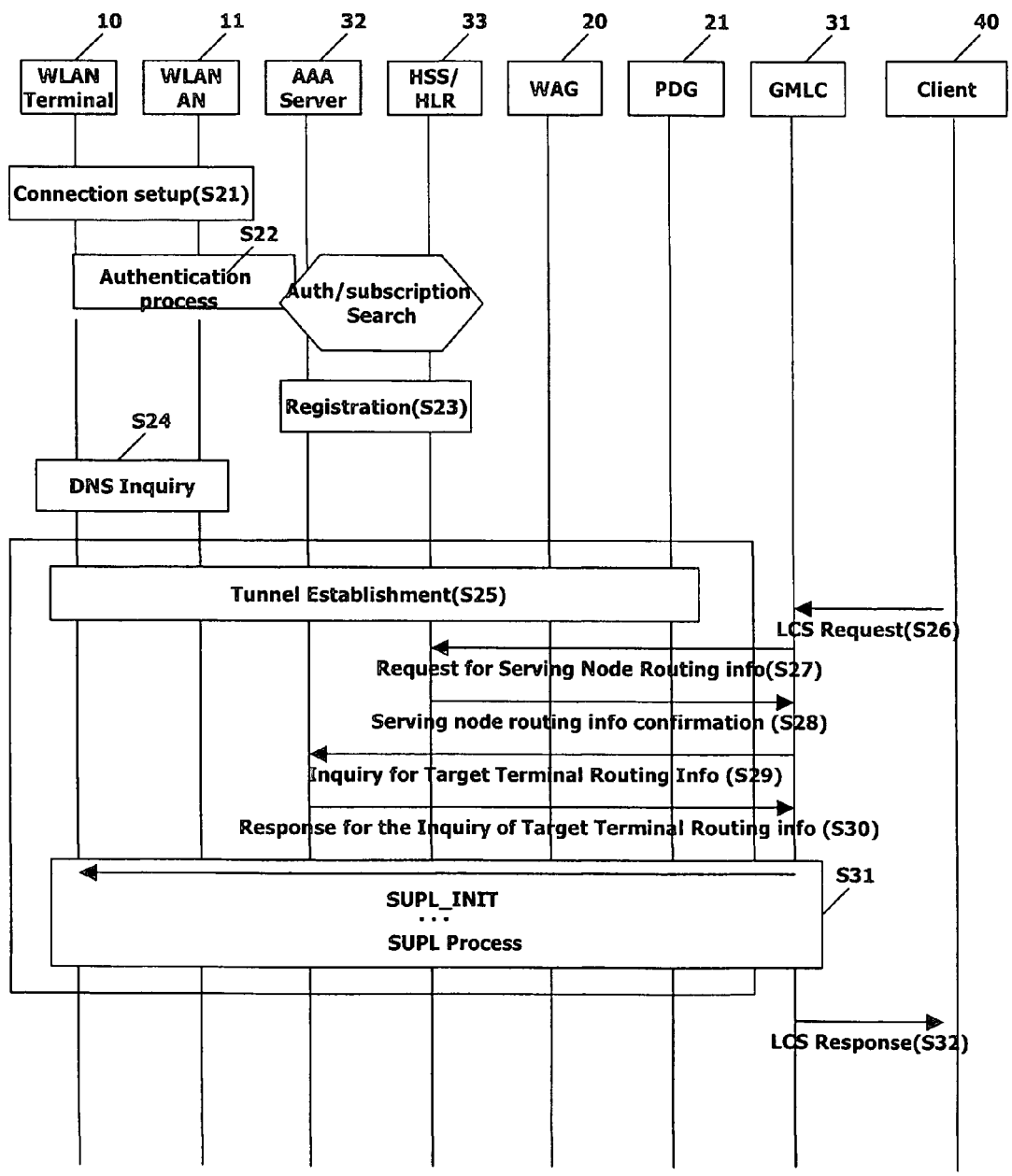
FIG. 3 is a flow chart illustrating a method for providing a location information service through interworking between the WLAN and the mobile communication network in accordance with a first embodiment of the present invention.

FIG. 3 is a flow chart illustrating a method for providing a location information service through interworking between the WLAN and the mobile communication network in accordance with a first embodiment of the present invention. The method of FIG. 3 is described herein as implemented in the system of FIG. 2 as an example, but can be implemented in other suitable device/system. The processes to be performed by the WLAN terminal 10 can be performed and/or controlled by the controller 10a of the WLAN terminal 10.

Referring to FIG. 3, the WLAN terminal 10 selects a currently accessible suitable WLAN AN 11 and attempts a connection with the WLAN AN 11. When the WLAN terminal 10 is connected with the WLAN AN 11 (step S21), the WLAN AN 11 performs a mutual authentication procedure between the WLAN terminal 10 and the WLAN AN 11 through communication with the AAA server 32 of the mobile communication network 30. In this case, an EAP (Extensible Authentication Protocol) authentication procedure is performed by using an EAP; however, other types of authentication procedure may be used. An EAP packet for the EAP authentication procedure is transferred up to the AAA server 32 of the mobile communication network 30 via the WLAN AN 11. In this case, the WLAN AN 11 can go through an AAA proxy server in order to be connected with the AAA server 32. Then, in order to perform a mutual authentication procedure between the WLAN terminal 10 and the AAA server 32, the AAA server 32 can be connected and communicate with the HSS/HLR 33 to fetch authentication information therefrom. The authentication information includes authentication vectors the AAA server 32 has previously registered for authenticating the WLAN terminal 10, which can include key information associated with the WLAN terminal 10. Generally, the HSS/HLR 33 stores therein key or authentication information on each WLAN terminal that has been registered in the HSS/HLR 33.

The AAA server 32 can also receive subscription information of the WLAN terminal 10 from the HSS/HLR 33 by being connected therewith. The subscription information can include authorization information, a permanent ID (i.e., an IMSI (International Mobile Station/subscriber Identity)) of the WLAN terminal 10, and capability of the WLAN terminal 10 (step S22).

The AAA server 32 registers WLAN terminal information, e.g., the permanent identity of the WLAN terminal 10, by interworking with the HSS/HLR 33. In this case, the AAA server 32 registers its address which has undergone the authentication procedure by the WLAN terminal 10, to the HSS/HLR 33 (step S23).

After the WLAN terminal 10 has been authenticated through the AAA server 32 of the mobile communication network 30 and registered through the HSS/HLR 33 of the mobile communication network 30, the WLAN terminal 10 can obtain access information (e.g., IP address, etc.) of the PDG (access point) 21 to receive a mobile communication packet service through a DNS (Domain Name System) query (step S24).

The WLAN terminal 10 selects one of access information of access points obtained through the DNS query, and forms a tunnel, namely, an IP connection such as a TCP/IP or UDP/IP connection with the PDG 21, for supporting a packet service with the selected access point (PDG) 21 (step S25). When selecting an access point, the WLAN terminal 10 selects an access point of a similar type of address (e.g., an IPv4 or IPv6) to its IP address.

Thereafter or during the tunnel forming process, the client 40 requests a service for providing information on a location of a target terminal (step S26). That is, the client 40 generates and sends a location information service (LCS) request for requesting location information of a target terminal (e.g., WLAN terminal 10) to the location server (GMLC) 31.

The location server 31 requests serving node routing information and terminal capability from the HSS/HLR 33 in order to obtain information of a serving node to which the target terminal (WLAN terminal 10) belongs, namely, information (e.g., address) of the AAA server (step S27). In this case, the capability information of the target terminal refers to capability information of the target terminal relevant to location tracking such as whether or not the target terminal supports the SUPL and/or whether or not the target terminal supports a location tracking procedure defined in the existing mobile communication network. Before being connected with the HSS/HLR 33, the location server 31 can be connected with the PPR 34 to confirm previously registered location tracking service information and privacy information of the target terminal such as the WLAN terminal 10. In this case, the WLAN terminal 10 can previously register its privacy information relevant to the location tracking service at the PPR 34, and when the PPR 34 permits the location tracking service requested by the client 40 after checking the privacy information, the location server 31 can perform step S27.

Then in response to the request at step S27, the HSS/HLR 33 transfers the serving node routing information such as the address of the AAA server 32 of the WLAN terminal 10, and the capability information of the target terminal (WLAN terminal 10) to the location server 31 through a serving node routing information confirmation message (step S28).

In this case, the capability information of the target terminal includes information for selecting a terminal location tracking method, and can be used for determining whether or not the target terminal supports the SUPL or for determining a positioning method that can be supported by the 3GPP or a particular communication network.

When the WLAN terminal 10 (target terminal) supports the SUPL, the location server (GMLC) 31 accesses the AAA server 32 by using the address of the AAA server 32 received from the HSS/HLR 33, and requests routing information of the WLAN terminal 10 to the AAA server 32. The routing information of the WLAN terminal 10 (i.e., the target terminal routing information) includes at least the following: (i) the IP address of the WLAN terminal 10, and (ii) information on the access point to which the tunnel has been set with the WLAN terminal 10. The information (ii) can indicate whether or not the tunnel between the WLAN terminal 10 and the PDG 21 (AP) has been established, e.g., from step S25. As one of the alternatives, the routing information of the WLAN terminal 10 includes at least the following: (i) the IP address of the WLAN terminal 10, (ii) the information on the access point (PDG) to which the tunnel has been set with the WLAN terminal 10, and (iii) information on a currently set wireless access point name (W-APN) of the WLAN terminal 10. The W-APN information (iii) includes a W-APN network identifier (NI) indicating an ID of an external IP network connected with the WLAN terminal 10 through the AP (PDG) 21, and a W-APN operator identifier (OI) indicating an ID of the mobile communication network 30 with which the WLAN terminal 10 has been connected, and such information can be used as needed. The information (ii) is also referred to herein as tunnel information.

In response to the request at step S29, the AAA server 32 then transmits the requested routing information of the target terminal (i.e., WLAN terminal 10) to the location server 31 (step S30).

Figure 1:
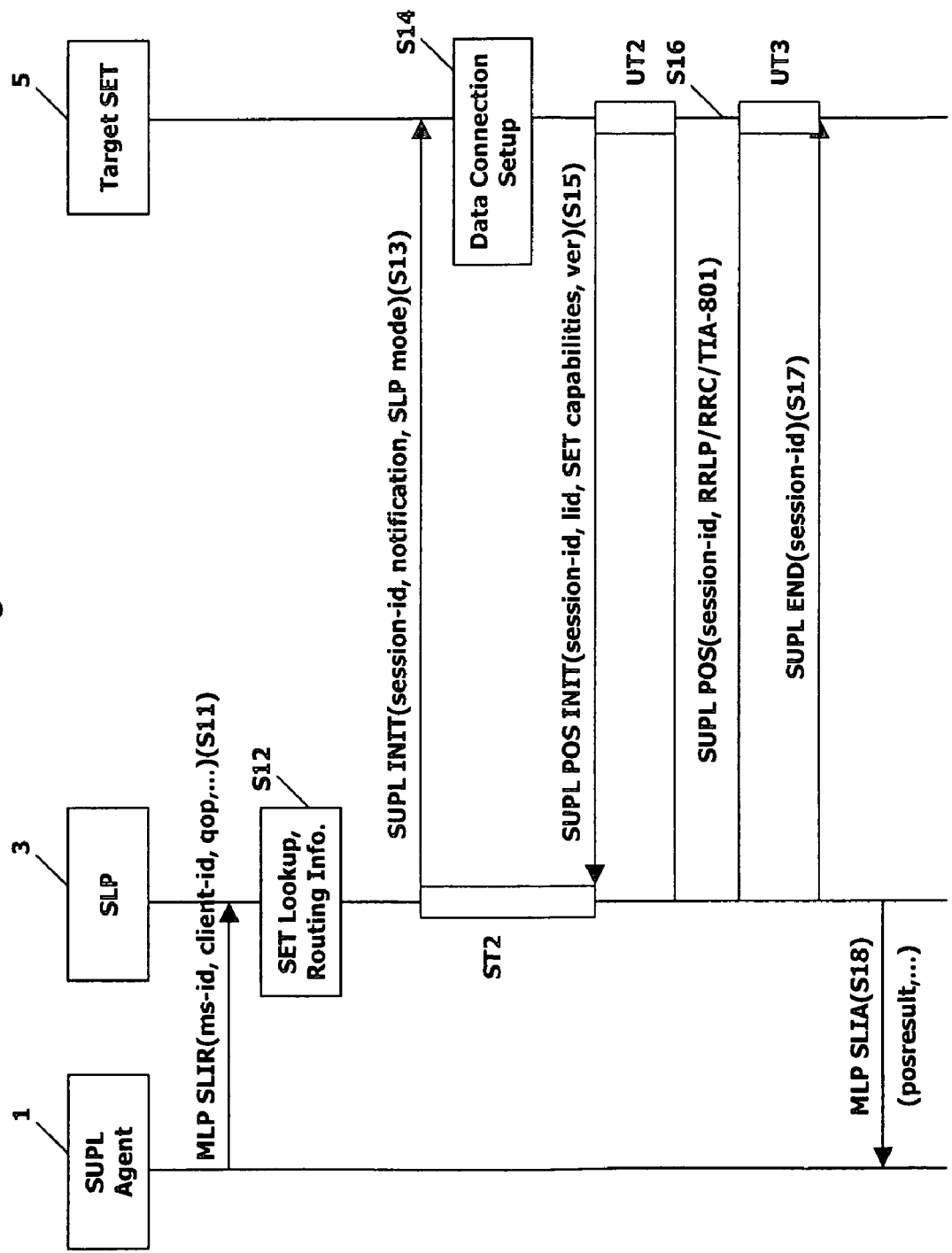
FIG. 1 is a flow chart illustrating a SUPL procedure for requesting location information of a particular terminal in a non-roaming, proxy mode.

The location server 31 generates a SUPL initialization (SUPL INIT) message and transmits it to the WLAN terminal 10 by using the received routing information of the WLAN terminal 10 to start the SUPL procedure. In this case, determining that a tunnel has been already formed between the WLAN terminal 10 and the AP 21 based on the tunnel information of the target terminal routing information, the location server 31 transmits the SUPL initialization message to the WLAN terminal 10 through the established tunnel, namely, through the TCP/IP or UDP/IP connection. Thereafter, the SUPL procedure for tracking a location of the WLAN terminal 10 is continuously performed through the established tunnel (step S31). After the location information of the WLAN terminal 10 is calculated by, e.g., the location server or the WLAN terminal 10, the location server 31 terminates the SUPL procedure and transmits the calculated location information of the WLAN terminal 10 to the client 40 (step S32), e.g., using an LCS response message. Here, the SUPL procedure of step S31 can be any conventional SUPL procedure or the SUPL procedure of FIG. 1 including the use of the SLP mode indicator. Also at step S31, the communications between the WLAN terminal 10 and the location server 31 are carried out through the AP 21, i.e., through the established tunnel (IP connection).

In a state that the WLAN terminal 10 has undergone the authentication and registration process through the AAA server 32 and the HSS/HLR 33 of the mobile communication network 30 and the tunnel has been formed for the packet service between the WLAN terminal 10 and the AP (PDG) 21, when the location server (GMLC) 31 connected with the mobile communication network 30 receives a request for location information of the WLAN terminal 10 from the client 40, in the first embodiment of the present invention, the SUPL procedure between the location server 31 and the WLAN terminal 10 is performed through the formed tunnel, so that a new TCP/IP or UDP/IP connection for carrying out the SUPL procedure does not need to be opened between the location server 31 and the WLAN terminal 10, and the location information of the WLAN terminal 10 can be calculated through the use of the existing tunnel.

Additionally, regarding the IP address of the WLAN terminal 10 (e.g., provided in the target terminal routing information), a static (permanent) IP address can be allocated to the WLAN terminal 10, or a dynamic IP address can be allocated to the WLAN terminal 10 each time whenever the tunnel is formed with the AP 21. When the static IP address is allocated to the WLAN terminal 10, the allocated static IP address is stored in the HSS/HLR 33, while the dynamic IP address is stored in the AAA server 32 each time it changes. Thus, if the static IP address is allocated to the WLAN terminal 10, when the serving node routing information is requested by the location server 31 at step S27, the HSS/HLR 33 can directly transmit the IP address of the WLAN terminal 10 to the location server 31 in step S28 by transmitting the stored IP address of the WLAN terminal 10. In this case, steps S29 and S30 may be omitted and the location server 31 may immediately perform the SUPL procedure by using the IP address of the WLAN terminal 10 included in the serving node routing information. As an alternative, steps S29 and S30 may be performed to obtain only certain information such as the tunnel information that indicates whether or not the tunnel has been established. However, this information may be provided in a previous step, to completely omit steps S29 and S30 when the static IP address of the WLAN terminal 10 is involved.

On the other hand, if the dynamic IP address of the WLAN terminal 10 is involved, steps S29 and S30 are performed as discussed above since the IP address of the WLAN terminal 10 generally changes each time a tunnel between the WLAN terminal 10 and the PDG 21 is established. That is, when the dynamic IP address has been allocated to the WLAN terminal 10, the location server 31 can know the IP address of the WLAN terminal 10 through the AAA server 32 as shown in steps S29 and S30.

The SUPL POS INIT message corresponds to a response message to the SUPL initialization message transmitted from the location server 31. The SUPL INIT message, the SUPL POS INIT message, and other related SUPL procedure messages are known.

Accordingly, the present invention provides an effective system and method for providing a location information service to a terminal by interworking a WLAN and a mobile communication network.

Figure 4:
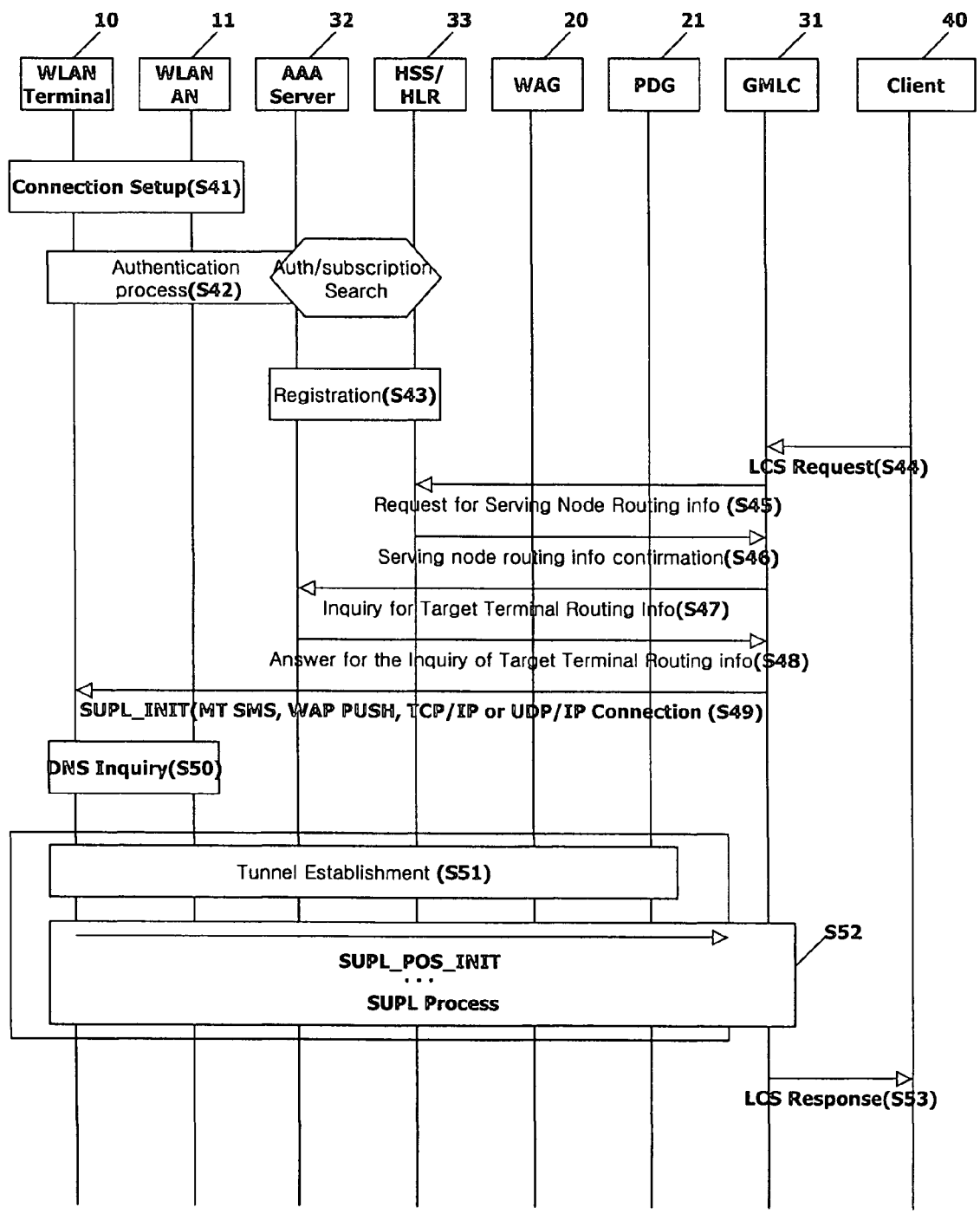
FIG. 4 is a flow chart illustrating a method for providing a location information service through interworking between the WLAN and the mobile communication network in accordance with a second embodiment of the present invention.

FIG. 4 is a flow chart illustrating a method for providing a location information service through interworking between the WLAN and the mobile communication network in accordance with a second embodiment of the present invention. The method of FIG. 4 is described herein as implemented in the system of FIG. 2 as an example, but can be implemented in other suitable device/system. The processes to be performed by the WLAN terminal 10 can be performed and/or controlled by the controller 10a of the WLAN terminal 10.

Referring to FIG. 4, a process in which the WLAN terminal 10 is connected with the mobile communication network 30 through the authentication and registration procedure (steps S41~S43) is the same as or similar to steps S21~S23, respectively, in FIG. 3. Thus the description of steps S41 to S43 is omitted for the sake of brevity.

When a location information service request for requesting location information of a target terminal (e.g., WLAN terminal 10) is generated by the client 40, the client 40 requests a location service (LCS) of the target terminal from the location server (GMLC) 31 by sending the LCS request to the location server 31 (step S44).

In order to obtain information on a serving node to which the target terminal belongs, the location server 31 then requests serving node routing information (e.g., address information of the AAA server 32) and capability of the target terminal from the HSS/HLR 33 (step S45). In this case, the capability information of the target terminal refers to capability information of the target terminal relevant to location tracking such as whether or not the target terminal supports the SUPL and/or whether or not the target terminal supports a location tracking procedure defined in the existing mobile communication. Before being connected with the HSS/HLR 33, the location server 31 can be connected with the PPR 34 to confirm previously registered location tracking service information and privacy information of the target terminal such as the WLAN terminal 10. In this case, the WLAN terminal 10 can previously register its privacy information relevant to the location tracking service at the PPR 34, and when the PPR 34 permits the location tracking service requested by the client 40 after checking the privacy information, the location server 31 can perform step S45.

In response to the request at step S45, the HSS/HLR 33 transfers the serving node routing information (e.g., address of the AAA server 32) of the WLAN terminal 10 and the capability of the WLAN terminal 10 to the location server 31 through a serving node routing information confirmation message (step S46).

If the WLAN terminal supports the SUPL (e.g., based on the received capability information of the target terminal), the location server 31 is connected with the AAA server 32 by using the address of the AAA server 32 received from the HSS/HLR 33, and requests routing information of the WLAN terminal 10 to the AAA server 32 (step S47). The routing information of the WLAN terminal 10 includes at least the following: (i) the address (e.g., IP address) of the WLAN terminal 10, and (ii) information (tunnel information) on the access point (e.g., PDG 21) to which the tunnel has been set with the WLAN terminal 10. As discussed above, the tunnel information (ii) indicates whether or not the tunnel between the WLAN terminal 10 and the PDG 21 has been established. As another alternative, the routing information of the WLAN terminal 10 includes at least the following: (i) the IP address of the WLAN terminal 10, (ii) the information (tunnel information) on the access point (PDG) to which the tunnel has been set with the WLAN terminal 10, and (iii) information on a currently set wireless access point name (W-APN) of the WLAN terminal 10. The W-APN information (iii) includes a W-APN network identifier (NI) indicating an ID of an external IP network connected with the WLAN terminal 10 through the AP (PDG) 21, and a W-APN operator identifier (OI) indicating an ID of the mobile communication network 30 with which the WLAN terminal 10 has been connected, and such information can be used as needed.

In response to the request at step S47, the AAA server 32 then transmits a target terminal routing information inquiry response message to the location server 31 (step S48). The terminal routing information inquiry response message includes the requested information such as the routing information of the target terminal (WLAN 10).

The location server 31 receives the target terminal routing information inquiry response message. When the location server 31 determines that there is no currently set IP connection, namely, there is no tunnel connection between the WLAN terminal 10 and the PDG 21, e.g., based on the received target terminal routing information, the location server 31 generates a SUPL initialization (SUPL INIT) message and transmits it to the WLAN terminal 10 by using an SMS (Short Message Service) method or a WAP (Wireless Application Protocol) push method to thereby instruct a data connection setup (step S49). As a variation, the location server 31 can transmit the SUPL initialization message to the WLAN terminal 10 through a TCP/IP or UDP/IP connection.

Then, the WLAN terminal 10 obtains access information (e.g., IP address, etc.) of the AP 21 through a DNS (Domain Name System) query to set up a data connection to receive a mobile communication packet service (step S50). The WLAN terminal 10 selects one of access information of the APs obtained through the DNS query and sets up a data connection (tunnel) with the selected AP (step S51). When selecting the AP, the WLAN terminal 10 selects the AP of a similar type of address to its IP address.

After the tunnel such as an IP connection (e.g., a TCP/IP or UDP/IP connection) has been established between the WLAN terminal 10 and the AP (PDG) 21, the WLAN terminal 10 transmits, in response to the SUPL INIT message, a SUPL position initialization (SUPL POS INIT) message for starting the actual location tracking procedure to the location server 31 through the established tunnel, namely, through a session. In this case, the WLAN terminal 10 can transmit its IP address together with or in the SUPL POS INIT message. Thereafter, the SUPL procedure for tracking the location of the WLAN terminal 10 is continuously performed through the session (step S52). When the location information of the WLAN terminal 10 is calculated (e.g., by the location server 31 or the WLAN terminal 10), the location server 31 obtains the calculated location information, terminates the SUPL procedure, and transmits the obtained calculated location information of the WLAN terminal 10 to the client 40, e.g., via an LCS response (step S53).

Regarding the IP address of the WLAN terminal 10, a static (permanent) IP address can be allocated to the WLAN terminal 10, or a dynamic IP address can be allocated to the WLAN terminal 10 each time whenever a tunnel is formed with the AP 21. When the static IP address is allocated to the WLAN terminal 10, the allocated static IP address can be stored in the HSS/HLR 33, while the dynamic IP address can be stored in the AAA server 32 each time it changes.

In a state that the WLAN terminal 10 has finished the authentication and registration process through the AAA server 32 and the HSS/HLR 33 of the mobile communication network 30, when the location server 31 connected with the mobile communication network 30 receives a request for the location information of the WLAN terminal 10 from the client 40 while the tunnel for the packet service (e.g., a TCP/IP or UDP/IP connection) has not been formed between the WLAN terminal 10 and the AP 21, in accordance with the second embodiment of the present invention, the AAA server 32 informs the location server 31 that no tunnel has been set between the WLAN terminal 10 and the AP 21, e.g., after examining the target terminal routing information. Then, the location server 31 instructs to set up a data connection between the WLAN 10 and the AP 21 by transmitting the SUPL initialization message to the WLAN terminal 10. Then the WLAN terminal 10 sets up a data connection (tunnel) with the AP 21 and transmits the SUPL POS initialization message to the location server 31 through the set data connection, namely, the session. Accordingly, the location information of the WLAN terminal 10 can be calculated or obtained by the location server 31 of the mobile communication network 30.

FIG. 5 is a flow chart illustrating a method for providing a location information service through interworking between the WLAN and the mobile communication network in accordance with a third embodiment of the present invention. The method of FIG. 5 is described herein as implemented in the system of FIG. 2 as an example, but can be implemented in other suitable device/system. The processes to be performed by the WLAN terminal 10 can be performed and/or controlled by the controller 10*a* of the WLAN terminal 10.

Referring to FIG. 5, the WLAN terminal 10 selects a currently accessible suitable WLAN AN 11 and attempts a connection thereto. When the WLAN terminal 10 is connected with the WLAN AN 11 (step S61), the WLAN AN 11 performs an authentication procedure with the WLAN terminal 10 (steps S62 and S63). For instance, the WLAN AN 11 transmits an EAP (Extensible Authentication Protocol) request message to the WLAN terminal 10 (step S62), and the WLAN terminal 10 responds to the WLAN through an EAP response message (step S63). Other types of authentication protocol may be used.

Then, the WLAN AN 11 and the WLAN terminal 10 exchanges terminal location related information with each other. When the WLAN AN 11 provides the terminal location related information to the WLAN terminal 10 through the EAP request message at step S62, the terminal location related information includes location information of a WLAN AP that the WLAN terminal 10 has currently accessed. Then in response, if the WLAN terminal 10 includes a GPS receiver, which may be used to determine the location information of the WLAN terminal 10, when the WLAN terminal 10 provides the terminal location related information to the WLAN AN 11 through the EAP response message at step S63, the terminal location related information includes the location information of the WLAN terminal 10. Thus, each of the WLAN terminal 10 and the WLAN AN 11 obtains, respectively, location information of the associated WLAN AP and the WLAN terminal 10.

Here, the AP location information or the WLAN terminal location information can have a civil address form defined in an IETF GEOPRIV protocol or coordinate information (x, y, z). FIG. 6 shows an example of the civil address form defined in the IETF, which can be used in the present invention.

The WLAN AN 11 performs an authentication procedure on the WLAN terminal through communication with the AAA server 32. Namely, the WLAN AN 11 transmits the EAP response message which has been received from the WLAN terminal 10 to the AAA server 32 (step S64). In case of roaming of the WLAN terminal 10, the EAP response message is transmitted to the AAA server 32 through an AAA proxy server (not shown). In this case, the WLAN AN 11 provides the terminal location related information, e.g., location information of an AP to which the WLAN terminal 10 belongs and/or location information of the WLAN terminal 10 received directly from the WLAN terminal 10, together with the EAP response message to the AAA server 32.

In order to perform the mutual authentication procedure between the WLAN AN 11 and the WLAN terminal 10, the AAA server 32 can be connected with the HSS/HLR 33 to fetch authentication information stored in the HSS/HLR 33. The authentication information can be authentication vectors that the AAA server 33 has previously registered to authenticate the WLAN terminal 10, which can include key information. In addition, the AAA server 32 can also request and receive subscription information of the WLAN terminal 10 from the HSS/HLR 33 by being connected with the HSS/HLR 33 (step S65). The subscription information can be authorization information, a permanent identity (e.g., the IMSI) of the WLAN terminal 10, and capability of the terminal, etc.

The AAA server 32 registers the information of the WLAN terminal 10, e.g., the permanent identity (e.g., the IMSI) of the WLAN terminal 10, by interworking with the HSS/HLR 33. In this case, the AAA server 32 also registers its address together which has undergone the authentication procedure by the WLAN terminal 10. In addition, the AAA server 32 can register the terminal location related information (e.g., the location information of the WLAN terminal 10 received from the WLAN AN 11 and/or the location information of the WLAN AP to which the WLAN terminal 10 belongs) to the HSS/HLR 33 (step S66). As a result, the HSS/HLR 33 stores therein the terminal location related information, which is some location information associated with the WLAN terminal, e.g., the actual location information of the WLAN terminal 10 and/or the location information of the WLAN AP to which the WLAN terminal 10 belongs.

When the authentication/registration procedure is successfully completed (step S67), the AAA server 32 informs the WLAN terminal 10 of the completion through the I-WLAN AN 11 (steps S68, S69).

The WLAN terminal 10 obtains access information (an IP address, etc) of APs through a DNS query to receive a mobile communication packet service through the AP (step S70). The WLAN terminal 10 selects one of access information of the APs obtained through the DNS query, and then forms a tunnel such as an IP connection (e.g., a TCP/IP or UDP/IP connection) for supporting a packet service with the selected AP (PDG) 21 (step S71). When selecting the AP, the WLAN terminal 10 can select an AP having an address (e.g., IPv4 or IPv6) of a similar type to its IP address.

Thereafter, when a location information service request for requesting location information of a target terminal (e.g., WLAN terminal 10) is generated by the client 40, the client 40 requests tracking of the location information of the target terminal from the location server 31 by sending an LCS request to the location server (GMLC) 31 (step S72). Here, the request for the location information of the target terminal includes a QoP (Quality of Position) request/information.

In order to obtain information (e.g., address) on a serving node to which the target terminal (WLAN terminal 10) belongs and to obtain information on the capability of the target terminal, the location server 31 sends an inquiry of the serving node routing information to the HSS/HLR 33 (step S73). In this case, the capability information of the target terminal refers to capability information of the target terminal relevant to location tracking such as whether or not the target terminal supports the SUPL and/or whether or not the target terminal supports a location tracking procedure defined in the existing mobile communication network. Before being connected with the HSS/HLR 33, the location server 31 can be connected with the PPR 34 to confirm previously registered location tracking service information and privacy information of the target terminal such as the WLAN terminal 10. In this case, the WLAN terminal 10 can previously register its privacy information relevant to the location tracking service at the PPR 34, and when the PPR 34 permits the location tracking service requested by the client 40 after checking the privacy information, the location server 31 can perform step S73. A user of the target terminal, namely, the WLAN terminal 10, can previously register privacy information related to the location tracking service of the user, and in this state, when the user permits the location tracking service requested by the corresponding client 40, the location server 31 can perform step S73.

In response to the request at step S73, the HSS/HLR 33 transfers the serving node routing information (e.g., the address of the AAA server 32) associated with the WLAN terminal 10 and the capability information of the WLAN terminal 10 to the location server 31 through a serving node routing information response message (step S74). At this time, the HSS/HLR 33 also provides any terminal location related information received from the WLAN AN 11 (and stored therein at step S66) through the serving node routing information response message (step S74). Here the terminal location related information includes the location information of the WLAN AP to which the WLAN terminal 10 belongs and/or the location information of the WLAN terminal 10. If the terminal location related information is included in the serving node routing information response message and the included terminal location related information satisfies the QoP (Quality of Position) included in the location tracking (LCS) request received from the client 40 at step S72, the location server 31 provides location information of the WLAN terminal 10 based on the received terminal location related information to the client 40 without performing steps S75~S77 (step S78).

That is, the location server 31 analyzes the serving node routing information response message received from the HSS/HLR 33. If the serving node routing response message does not have the terminal location related information or if the included terminal location related information does not satisfy the QoP information identified in the LCS request, the process proceeds from step S74 to step S75 and the subsequent SUPL procedure. If, however, the terminal location related information (e.g., the location information of the WLAN terminal 10 or of the WLAN AP) from the HSS/HLR 33 satisfies the QoP (i.e., the location information is of sufficient quality), then instead of calculating the location information of the WLAN terminal 10, the location server 31 merely transmits the obtained terminal location related information as the location information of the target terminal to the client 40 at step S78. In this instance, the method bypasses steps S75-S77 of actually calculating the location of the target terminal via the SUPL procedure.

In addition, when the location server 31 wants to be connected with the AAA server 32 to directly receive the routing information of the target terminal (WLAN terminal 10) recorded in the AAA server 32, the process proceeds from step S74 to step S75.

At step S75, the location server 31 transmits a target terminal routing information inquire message for requesting the routing information of the target terminal, to the AAA server 32. The location server 31 then can obtain the routing information of the WLAN terminal 10 at step S76 in order to directly perform the SUPL procedure with the WLAN terminal 10. In addition, if at step S74 the serving node routing information response message received from the HSS/HLR 33 does not include the terminal location related information, the location server 31 can request at step S75 the terminal location related information from the AAA server 32 through the target terminal routing information inquiry message.

Upon receiving the target terminal routing information inquiry message, the AAA server 32 transmits the routing information of the target terminal (WLAN terminal 10) to the location server 31 through the target terminal routing information inquiry response message. Here, the routing information of the WLAN terminal 10 includes at least the following: (i) the address (e.g., IP address) of the WLAN terminal 10, and (ii) information (tunnel information) on the access point (PDG 21) to which the tunnel has been set with the WLAN terminal 10, e.g., at step S71. As discussed above, the tunnel information (ii) indicates whether or not the tunnel between the WLAN terminal 10 and the PDG 21 has been established. As another alternative, the routing information of the WLAN terminal 10 includes at least the following: (i) the IP address of the WLAN terminal 10, (ii) the information (tunnel information) on the access point (PDG) to which the tunnel has been set with the WLAN terminal 10, and (iii) information on a currently set wireless access point name (W-APN) of the WLAN terminal 10. The W-APN information (iii) includes a W-APN network identifier (NI) indicating an ID of an external IP network connected with the WLAN terminal 10 through the AP (PDG) 21, and a W-APN operator identifier (OI) indicating an ID of the mobile communication network 30 with which the WLAN terminal 10 has been connected, and such information can be used as needed.

And if the location server 31 requests the terminal location related information to the AAA server 32 at step S75 (e.g., because it was not received at step S74), the AAA server 32 provides the terminal location related information, if any, together with the target terminal routing information to the location server 31 at step S76. At this point, if it is determined that the terminal location related information is received from the AAA server 32 and satisfies the QoP information received from the client 40 or from another entity, the location server 31 transmits the received terminal location related information (e.g., the location information of the WLAN terminal 10 or a WLAN AP to which the WLAN terminal 10) as the location information of the WLAN terminal 10 directly to the client 40 through a location information service response message, without performing step S77 (step S78). If, however, the requested terminal location related information is not received from the AAA server 32, or the terminal location related information received from the AAA server 32 does not satisfy the QoP, or the location server 31 wants to directly perform the location tracking procedure by using the SUPL procedure with the WLAN terminal 10, then the location server 31 starts the SUPL procedure by using the IP address of the WLAN terminal 10 included in the target terminal routing information inquiry response message received from the AAA server 32. If the location server 31 determines that a tunnel has been already formed between the WLAN terminal 10 and the AP 21 by examining the AP information (tunnel information) included in the target terminal routing information inquiry response message, the location server 31 transmits a SUPL initialization (SUPL INIT) message for starting the SUPL procedure through the established tunnel such as the TCP/IP or UDP/IP connection (S77). Here, the SUPL procedure of step S77 can be any conventional SUPL procedure or the SUPL procedure of FIG. 1 including the use of the SLP mode indicator. The SUPL procedure is continuously performed through the tunnel, whereby the location information of the WLAN terminal 10 is calculated. As an alternative, the WLAN terminal 10 can also transmit directly the terminal location related information, which has been provided when the authentication procedure was performed with the WLAN AN 11 at steps S62 and S63, to the location server 31 at step S77 without separately performing the position calculating procedure.

When the location information of the WLAN terminal 10 is calculated by, e.g., the location server or the WLAN terminal 10 at step S77, the location server 31 obtains the calculated location information (posresult) of the WLAN terminal 10, terminates the SUPL procedure, and provides the calculated location information of the WLAN terminal 10 to the client 40 (step S78). As a variation as discussed above, if the terminal location related information is provided from the WLAN terminal 10 and the provided terminal location related information satisfies the QoP, the location server 31 can provide the received terminal location related information to the client 40 as the location information of the target terminal (e.g., without separately calculating the location of the target terminal).

When the WLAN terminal 10 is connected with the WLAN AN 11, it can receive location information of the WLAN AP to which the WLAN terminal 10 belongs from the WLAN AN 11, or by having the GPS receiver, the WLAN terminal 10 can provide its location information to the WLAN AN 11. When the WLAN terminal 10 performs the authentication and registration through the AAA server 32 and the HSS/HLR 33 as discussed above, the location information of the WLAN AP to which the WLAN terminal 10 belongs or the location information of the WLAN terminal 10 is stored in the AAA server 32 and then the HSS/HLR 33. In a state that a tunnel for a packet service has been formed between the WLAN terminal 10 and the AP 21, when the location server 31 connected with the mobile communication network 30 receives a request for the location information of the WLAN terminal 10 from the client 40, in accordance with the third embodiment of the present invention, if the terminal location related information received by the HSS/HLR 33 or the AAA server 32 satisfies a certain QoP, the location server 31 immediately provides the terminal location related information to the client 40 without performing the SUPL procedure to actually calculate the location information. On the other hand, if the terminal location related information does not satisfy the QoP, the location server 31 performs the SUPL procedure with the WLAN terminal 10 through the tunnel already formed between the WLAN 10 and the AP.

Additionally, regarding the IP address of the WLAN terminal 10, a static (permanent) IP address can be allocated to the WLAN terminal 10, or a dynamic IP address can be allocated to the WLAN terminal 10 each time whenever the tunnel is formed with the AP 21. When the static IP address is allocated to the WLAN terminal 10, the allocated static IP address is stored in the HSS/HLR 33, while the dynamic IP address is stored in the AAA server 32 each time it changes. Thus, if the static IP address is allocated to the WLAN terminal 10, when the serving node routing information is requested by the location server 31 at step S73, the HSS/HLR 33 can directly transmit the IP address of the WLAN terminal 10 to the location server 31 in step S74 by transmitting the stored IP address of the WLAN terminal 10. In this case, steps S75 and S76 may be omitted and the location server 31 may immediately perform the SUPL procedure by using the IP address of the WLAN terminal 10 included in the serving node routing information. As an alternative, steps S75 and S76 may be performed to obtain only certain information such as the tunnel information that indicates whether or not the tunnel has been established. However, this information may be provided in a previous step, to completely omit steps S75 and S76 when the static IP address of the WLAN terminal 10 is involved.

On the other hand, if the dynamic IP address of the WLAN terminal 10 is involved, steps S75 and S76 are performed as discussed above since the IP address of the WLAN terminal 10 generally changes each time a tunnel between the WLAN terminal 10 and the PDG 21 is established. That is, when the dynamic IP address has been allocated to the WLAN terminal 10, the location server 31 can know the IP address of the WLAN terminal 10 through the AAA server 32 as shown in steps S75 and S76.

Figure 7:
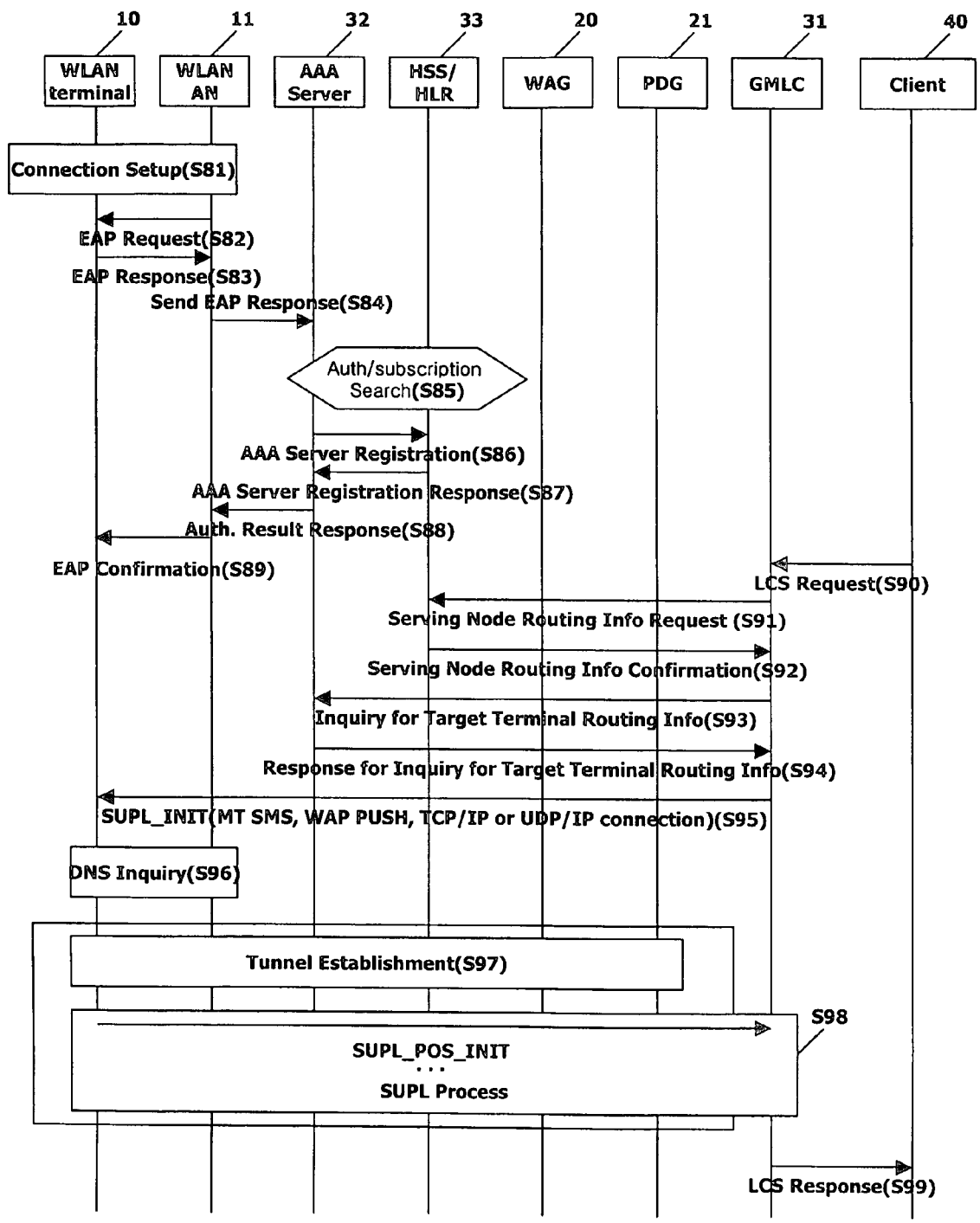
FIG. 7 is a flow chart illustrating a method for providing a location information service through interworking between the WLAN and the mobile communication network in accordance with a fourth embodiment of the present invention.

FIG. 7 is a flow chart illustrating a method for providing a location information service through interworking between the WLAN and the mobile communication network in accordance with a fourth embodiment of the present invention. The method of FIG. 7 is described herein as implemented in the system of FIG. 2 as an example, but can be implemented in other suitable device/system. The processes to be performed by the WLAN terminal 10 can be performed and/or controlled by the controller 10*a* of the WLAN terminal 10.

Referring to FIG. 7, a process in which the WLAN terminal 10 is connected with the mobile communication network 30 after undergoing an authentication and registration procedure through the AAA server 32 and the HSS/HLR 33, and a process in which when the WLAN terminal 10 is authenticated or registered, the location information of the WLAN terminal 10 is provided by the WLAN terminal 10 itself (by using, e.g., the internal GPS receiver) or the location information of the WLAN AP to which the WLAN terminal 10 belongs is provided by the WLAN AN 11 (steps S81~S89), are performed in the same or similar manner as steps S61~S69 of FIG. 5. Therefore, the description of steps S81-S89 will be omitted for the sake of brevity.

In addition, a process, in which after the WLAN terminal 10 is connected with the mobile communication network 30 through the authentication and registration procedure, when a request for tracking location information of a target terminal is transmitted from the client 40 to the location server 31 (step S90), the location server 31 is connected with the HSS/HLR 33 to receive the serving node routing information associated with the target terminal and the capability information of the target terminal (steps S90-S92), is also performed in the same or similar manner as steps S72, S73 and S74 of FIG. 5. Therefore, the description of steps S90-S92 will be omitted for the sake of brevity.

For an additional explanation, when the terminal location related information, which has been received from the HSS/HLR 33 at step S92, satisfies the QoP included in the LCS received from the client 40, the location server 31 immediately provides the terminal location related information to the client 40 as the location information of the target terminal (WLAN terminal 10) (step S99), thereby possibly bypassing steps S93-S98.

However, after step S92, if the terminal location related information has not been provided from the HSS/HLR 33 or if the provided terminal location related information does not satisfy the QoP, the location server 31 performs step S93. And, if the location server 31 wants to be connected with the AAA server 31 to directly receive the routing information of the target terminal (WLAN terminal 10) recorded in the AAA server 32, step S93 is also performed.

The location server 31 transmits a target terminal routing information inquiry message for requesting the routing information of the target terminal to the AAA server 32 (S93).

The location server 31 can obtain the routing information of the WLAN terminal 10 at step S94 in order to directly perform the SUPL procedure with the WLAN terminal 10. In addition, if at step S92 the serving node routing information response message received from the HSS/HLR 33 does not include the terminal location related information, the location server 31 can request at step S93 the terminal location related information from the AAA server 32 through the target terminal routing information inquiry message.

Upon receiving the target terminal routing information inquiry message, the AAA server 32 transmits the routing information of the target terminal (WLAN terminal 10) to the location server 31 through the target terminal routing information inquiry response message (S94). Here, the routing information of the WLAN terminal 10 includes at least the following: (i) the address (e.g., IP address) of the WLAN terminal 10, and (ii) information (tunnel information) on the access point (PDG 21) to which the tunnel has been set with the WLAN terminal 10. As discussed above, the tunnel information (ii) indicates whether or not the tunnel between the WLAN terminal 10 and the PDG 21 has been established. As another alternative, the routing information of the WLAN terminal 10 includes at least the following: (i) the IP address of the WLAN terminal 10, (ii) the information (tunnel information) on the access point (PDG) to which the tunnel has been set with the WLAN terminal 10, and (iii) information on a currently set wireless access point name (W-APN) of the WLAN terminal 10. The W-APN information (iii) includes a W-APN network identifier (NI) indicating an ID of an external IP network connected with the WLAN terminal 10 through the AP (PDG) 21, and a W-APN operator identifier (OI) indicating an ID of the mobile communication network 30 with which the WLAN terminal 10 has been connected, and such information can be used as needed.

And if the location server 31 requests the terminal location related information to the AAA server 32 at step S93 (e.g., because it was not received at step S92), the AAA server 32 provides the terminal location related information together with the target terminal routing information to the location server 31 at step S94. At this point, if it is determined that the terminal location related information is received from the AAA server 32 and satisfies the QoP, the location server 31 transmits the terminal location related information as the location information of the WLAN terminal 10 directly to the client 40 through a location information service (LCS) response message, without performing steps S95-S98 (step S99). If, however, at step S94 the requested terminal location related information is not received from the AAA server 32, or the terminal location related information received from the AAA server 32 does not satisfy the QoP, or the location server 31 wants to directly perform the location tracking procedure by using the SUPL procedure with the WLAN terminal 10, then the location server 31 instructs the WLAN terminal 10 to set up a data connection (tunnel) to the location server 31 by transmitting a SUPL initialization (SUPL INIT) message to the WLAN terminal 10 by using an SMS method or a WAP (Wireless Application Protocol) push method (step S95). As variation, the location server (GMLC) 31 can transmit the SUPL initialization message to the WLAN terminal 10 through a TCP/IP or UDP/IP connection (S95).

Upon receiving the SUPL initialization message through the SMS method, the WAP push method, the TCP/IP or UDP/IP connection, or other techniques, the WLAN terminal 10 first obtains access information (e.g., an IP address, etc.) of APs through a DNS query to open a data connection with the AP 21 (step S96). The WLAN terminal 10 selects one of access information of the APs obtained through the DNS query, and forms a data connection (tunnel) with the selected AP (step S97). When selecting the AP, the WLAN terminal 10 selects an AP having an address (e.g., IPv4 or IPv6) of a similar type to its IP address.

Thereafter, the WLAN terminal 10 transmits a SUPL position initialization (SUPL POS INIT) message for starting the actual location tracking procedure to the location server 31 through the formed tunnel such as an IP connection (e.g., a TCP/IP or UDP/IP connection), namely, through a session (S98). In this case, the WLAN terminal 10 can include the IP address of the WLAN terminal 10 in the SUPL POS initialization message. The WLAN terminal 10 can also transmit directly the terminal location related information received from the WLAN AN 11 at steps S82 and S83, to the location server 31 through the established tunnel and the SUPL POS INIT message. The SUPL procedure is continuously performed between the WLAN terminal 10 and the location server 31 through the session at step S98.

When the location information of the WLAN terminal 10 is calculated through the SUPL procedure at step S98, the location server 31 obtains the calculated location information of the WLAN terminal 10, terminates the SUPL procedure (step S98), and provides the calculated location information (pos-result) of the WLAN terminal 10 to the client 40, e.g., through the LCS response (step S99). On the other hand, if the terminal location related information is provided from the WLAN terminal 10 and the provided terminal location related information satisfies the QoP, the location server 31 can directly provide the terminal location related information to the client 40 as the location information of the target terminal, thereby possibly bypassing the position calculating procedure.

When the WLAN terminal 10 is connected with the WLAN AN 11, it can receive location information of the WLAN AP to which the WLAN terminal 10 belongs from the WLAN AN 11, or by having the GPS receiver, the WLAN terminal 10 can provide its location information to the I-WLAN AN 11. When the WLAN terminal 10 performs authentication and registration through the AAA server 32 and the HSS/HLR 33, the location information of the WLAN AP to which the WLAN terminal 10 belongs or the location information of the WLAN terminal 10 is stored in the AAA server 32 and/or the HSS/HLR 33. In a state that a tunnel for a packet service has not been formed between the WLAN terminal 10 and the AP 21, if the location server 31 connected with the mobile communication network 30 receives a request for the location information of the WLAN terminal 10 from the client 40, in accordance with the fourth embodiment of the present invention, then the location server 31 immediately provides the terminal location related information to the client 40, if the terminal location related information is received by the HSS/HLR 33 or the AAA server 32 and satisfies the QoP of the location tracking request received from the client 40. On the other hand, if the terminal location related information is not received or the received terminal location related information does not satisfy the QoP, the location server 31 transmits the SUPL initialization message to the WLAN terminal 10 through the SMS method, the WAP push method, the TCP/IP or UDP/IP connection, etc. to instruct the WLAN terminal 10 to set up a data connection (tunnel). When the WLAN terminal 10 sets up the data connection (e.g., through an IP connection) with the AP 21 according to the instruction, the location server 31 then performs the SUPL procedure with the WLAN terminal 10 through the established data connection to calculate the location information of the WLAN terminal 10.

Additionally, regarding the IP address of the WLAN terminal 10, a static (permanent) IP address can be allocated to the WLAN terminal 10, or a dynamic IP address can be allocated to the WLAN terminal 10 each time whenever the tunnel is formed with the AP 21. When the static IP address is allocated to the WLAN terminal 10, the allocated static IP address is stored in the HSS/HLR 33, while the dynamic IP address is stored in the AAA server 32 each time it changes.

According to the preferred embodiments of the present invention, the WLAN terminal is a UE or a mobile terminal (but not limited thereto), which is capable of providing a location information service such as a SUPL service. Examples of the WLAN terminal can be, but are not limited to, a PT (Push To) client, a mobile phone, a UE (user equipment) for UMTS or the like, an MS (mobile station) for GSM or the like, a laptop computer, a PDA (personal digital assistant), various types of mobile terminals connected through the WLAN or other network, etc. A PT client can be a PTT (Push To Talk) client such as a PoC (Push-to-talk Over Cellular) client, a PTV (Push To View) client, a PTD (Push to Data) client, etc.

According to the present invention, there are same or similar steps in the first through fourth embodiments discussed herein. As such, variations discussed in any one embodiment of the present invention can be applied to other embodiments of the present invention, as needed.

The method(s) of the present invention can be implemented in part by using existing computer programming language. Such computer program(s) may be stored in portable or other types of storages or memories such as hard drive, RAM, ROM, PROM, etc. associated with one or more computers or computer-based devices such as the network server(s) and/or the WLAN terminal 10. Alternatively, such computer program(s) may be stored in a different storage medium such as a USB, magnetic disc, optical disc, magneto-optical disc, etc. Such computer program(s) may also take the form of a signal propagating across the Internet, extranet, intranet or other network and arriving at the destination device (e.g., network server(s) or WLAN 10) for storage and implementation. The computer programs are readable using a known computer or computer-based device.

The foregoing embodiments and advantages are merely exemplary and are not to be construed as limiting the present invention. The present teachings can be readily applied to other types of apparatuses and/or systems. The description of the present invention is intended to be illustrative, and not to limit the scope of the claims. Many alternatives, modifications, and variations will be apparent to those skilled in the art. In the claims, any means-plus-function clauses are intended to cover the structure described herein as performing the recited function and not only structural equivalents but also equivalent structures.

What is claimed is:

1. A method of providing a SUPL (Secure User Plane Location) service by interworking between a mobile communication network and a wireless local area network (WLAN), the method comprising:

receiving a location service request from a client;

requesting routing information to a HSS/HLR (Home Subscriber Server/Home Location Register);

receiving a routing information confirmation including the routing information from the HSS/HLR;

sending a WLAN UE (user equipment) routing information inquiry to an AAA (Authentication/Authorization/Accounting) server;

receiving a WLAN UE routing information response from the AAA server, wherein the WLAN UE routing information response includes WLAN UE address information;

sending a SUPL initiation message to a WLAN UE through a WLAN AN (access network) using the WLAN UE address information received from the AAA server;

receiving a SUPL positioning initiation message from the WLAN UE in order to start a SUPL positioning session with the WLAN UE;

exchanging SUPL positioning messages with the WLAN UE for performing the SUPL positioning session to calculate a location of the WLAN UE; and sending a location service response that includes the calculated location of the WLAN UE to the client, wherein the WLAN UE is roaming with the WLAN via the mobile communication network.

2. The method of claim 1, wherein the routing information further comprises at least one of information related to WLAN UE capability, information for selecting a WLAN UE tracking method, information about whether the WLAN UE supports SUPL, and information about whether the WLAN UE supports a location tracking procedure defined in the mobile communication network.

3. The method of claim 1, further comprising:
storing the WLAN UE address information received from the AAA server for later use.

4. The method of claim 1, wherein the mobile communication network is a 3GPP network having a WAG (WLAN Access Gateway) connected to an access point of the WLAN.

5. A method of receiving a secure user plane location (SUPL) service through interworking between a mobile communication network and a wireless local area network (WLAN), the method performed by a WLAN UE (user equipment) and comprising:

performing a connection setup procedure with an access point of the wireless local area network (WLAN);

performing an authentication procedure with an AAA (Authentication/Authorization/Accounting) server of the mobile communication network;

performing tunnel establishment with a packet data gateway (PDG) of the mobile communication network; and performing positioning procedures with a gateway mobile location center (GMLC) of the mobile communication network, the positioning procedures being performed via at least one secure user plane location (SUPL) positioning session comprising the steps of, receiving, through the access point of the WLAN, a SUPL initiation message from the GMLC that used WLAN UE address information received from the AAA server, sending a SUPL positioning initiation message to the GMLC in order to start a SUPL positioning session with the GMLC, and exchanging SUPL positioning messages with the GMLC for performing the SUPL positioning session to calculate a location of the WLAN UE, wherein the WLAN UE is roaming with the WLAN via the mobile communication network.

6. The method of claim 5, wherein the received SUPL initiation message contains information about at least one of a mobile terminal SMS, WAP PUSH, TCP/IP connection and UDP/IP connection.

7. The method of claim 5, wherein the tunnel establishment is performed before or after the GMLC receives the WLAN UE address information from the AAA server.

8. The method of claim 5, wherein the mobile communication network is a 3GPP network having a WAG (WLAN Access Gateway) connected to the access point of the WLAN.

* * * * *